July 8, 1941.   B. VON ANDREATTA ET AL   2,248,562
REPEATER COMPASS FOR SUBMARINE BOATS
Filed April 12, 1938   2 Sheets-Sheet 1

Inventors:
Bruno von Andreatta,
Wilhelm Krauskopf,

Attorneys

Inventors
Bruno van Andreatte,
Wilhelm Krausekopf,
Attorneys

Patented July 8, 1941

2,248,562

UNITED STATES PATENT OFFICE 2,248,562

REPEATER COMPASS FOR SUBMARINE BOATS

Bruno von Andreatta and Wilhelm Krauskopf, Kiel, Germany, assignors to Anschütz & Co. G. m. b. H., Kiel-Neumuhlen, Germany Application April 12, 1938, Serial No. 201,618
In Germany April 13, 1937

5 Claims. (Cl. 33—226)

Our invention relates to a repeater compass for submarine boats.

It is common practice to equip submarine boats with a gyroscopic master compass and with a plurality of repeater compasses controlled thereby and to use one of these repeater compasses for steering purposes. This instrument is included within a pressure-proof casing and, hence, may be left in its outboard position when the boat dives. The casing is provided with a pressure-proof window. As the pressure may rise up to 200 pounds per square inch, the diameter of the window is necessarily limited and, at any rate, much smaller than that of a compass dial of customary dimensions.

Therefore, in a compass of this type which was known prior to our invention, the window displayed but a small section of the dial just sufficient for steering purposes, but not suited for use in connection with a direction finding instrument which shall be adapted to be aimed at a target in any desired direction. Therefore, prior to our invention it was common practice on submarine boats to use a stationary dial attached to the boat, called "Pelorus," in connection with the direction finding instrument. This method, however, is difficult, inaccurate and impracticable during the night because of the poor illumination of the dial.

Another method that has been used in determining the direction of targets with direction finding instruments involves the use of an ordinary repeater compass having a full-sized dial. In view of the large size of the window, however, such a repeater compass cannot be made pressure-proof and, therefore, must be connected to a flexible cable permitting the compass to be withdrawn into the interior of the boat prior to the diving operation. Another reason why this compass cannot be made pressure-proof is the provision of the casing thereof with a hole for insertion of a key for the purpose of initially adjusting the compass when put in operation. It would be difficult to provide a reliable seal of this hole resisting high pressure.

The object of our invention is to provide a repeater compass for submarine boats which may be read directly for steering purposes and yet is adapted for use in connection with a direction finding instrument serving to determine the direction of targets relative to the boat but is so constructed that it may be left in its outboard position, when the boat dives.

We attain these and other objects which will appear from the description of a preferred embodiment of our invention following hereinafter by so constructing the compass that the diameter of its dial is reduced to that of the pressure-proof window and, for direction finding purposes, may be read therethrough by the direction finding instrument and is supplemented by a counter-course-indicator which may be read directly by the helmsman for steering purposes. On account of the reduced diameter of the dial, the scale thereon is too small for direct observation and, therefore, can only be read through the magnifying means of the direction finding instrument.

In other words, the dial affords no possibility of readily ascertaining the direction of the boat for steering purposes. However, direct observation is rendered possible by the additional provision of a countercourse-indicator, for instance of the type disclosed in the U. S. Patent No. 1,922,976 of Aug. 15, 1933.

We prefer to use an annular dial provided with a central opening exposing the countercourse-indicator arranged therebelow to view.

Moreover, we prefer to include, in the electric control cable of the compass, a switchboard adapted to disconnect the repeater compass from the master compass and to connect it with a manually operable transmitter. By means of this transmitter the repeater compass may be adjusted to the proper initial position before it is connected with the master compass. Therefore, the necessity of providing an opening in the casing for the insertion of a key and the consequent difficulties of sealing such opening are avoided.

In the drawings, we have shown a preferred embodiment of our invention.

Figure 1:
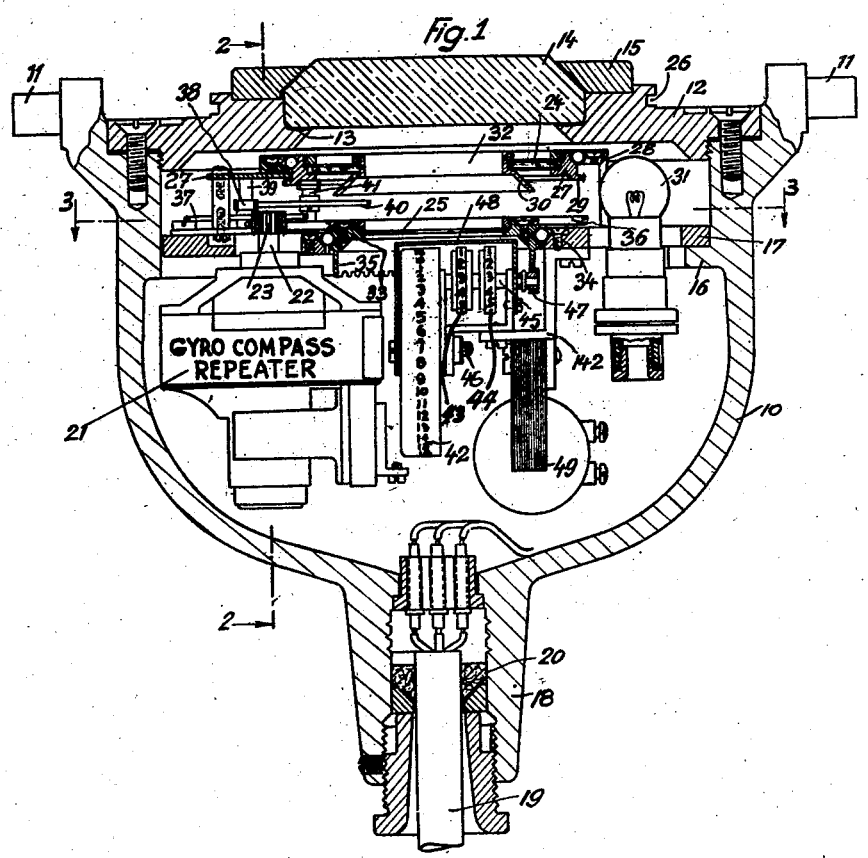
Fig. 1 is a vertical section taken along line 1—1 of Fig. 2.
Figure 2:
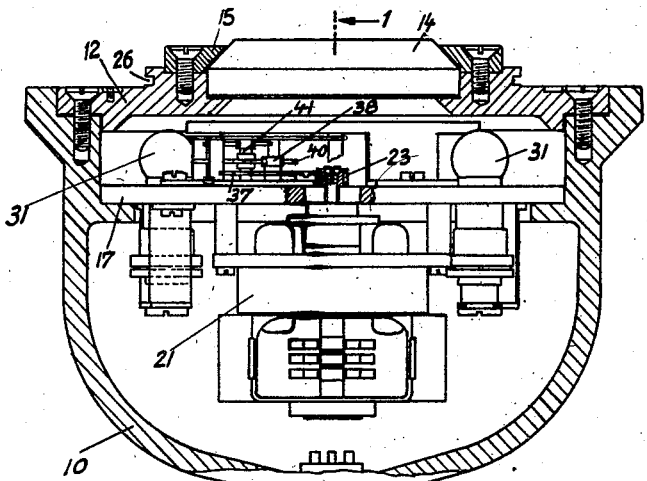
Fig. 2 is the vertical section taken along line 2—2 of Fig. 1.

The cup-shaped casing 10 is suspended in a Cardan ring in the customary manner and, for this purpose, is provided with trunnions 11 near its upper rim. It is closed by an annular cover 12 having a central opening provided with a wide flange 13 accommodating a circular glass plate 14 of a thickness which is sufficient to withstand high pressures, for instance a pressure of 200 pounds per square inch. The plate is kept in position by an annulus 15 engaging over its conical edge. Discs of packing material suitably interposed provide for a tight seal between the glass plate 14 and the cover 12. On its inside the casing is provided with a flange 16 carrying a supporting plate 17 to which the different parts of the compass are attached. The plate 17 and these parts constitute a unit which may be first assembled per se and then introduced into the casing as a whole. At its lower end the casing 10 is provided with a stuffing-box 18 through which the control cable 19 is introduced into the interior of the casing, a packing 20 being provided to seal the stuffing-box.

From the supporting plate 17 a receiving motor 21 depends which is connected to the conductors of the cable 19 and is remote-controlled from the master compass in a known manner which does not form part of our invention and need not be described in detail, as such receiving motors are well known in the art.

The armature shaft 22 of the receiving motor is provided with a pinion 23 adapted through a suitable transmission to operate the main compass dial 24 and a minute dial 25 coordinated thereto.

Figure 4:
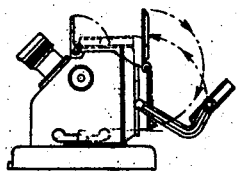
Fig. 4 is an elevation of the direction finding instrument adapted to be placed on and connected to the compass shown in Figs. 1, 2 and 3.

Although the diameter of the window closed by the glass plate 14 is much smaller than that of ordinary compass dials amounting, for instance, to but 3 inches, we have reduced the diameter of the main dial 24 approximately to the same amount. Therefore, the scale on the dial is so small that the helmsman cannot read it directly. For this purpose, special means to be described hereinafter are provided. The dial 24 serves solely to the use in connection with the direction finding instrument. Suitable means are provided on the casing for mounting this instrument thereon above the window for reading the dial. In the present embodiment these means comprise a collar provided with an annular groove 26 on which the instrument may be mounted so as to be rotatable about the vertical axis of the compass. The direction finding instrument is known in the art and, therefore, need not be described in detail. It is so constructed that two rays one coming from the target and the other one from the dial 24 are led to one and the same eye-piece whereby the observer will perceive an image of the target on the compass dial and may, therefore, directly read the azimuth of the target. In Fig. 4 we have shown an elevation of the instrument. As the instrument engages over the collar provided with the groove 26, it will effectively blind the window and thus prevent any light from shining therethrough. This is particularly important for nocturnal activities of submarines during war times.

The periphery of the compass dial 24 is attached in an internal groove of a ring 27 forming the inner race of a ball bearing, the outer race 28 of which is supported on the plate 17 by suitable spacer-bolts. Moreover, the ring 27 is integral with a spur gear 29 through which the dial is driven from the pinion 23. On its inner periphery the annular plate 24 made of a translucent material is provided with a polished sheet metal ring which, below the plate, flares outwardly so as to form a conical member 30 serving the purpose of upwardly reflecting light radiated from laterally disposed bulbs 31. The reflected light shines through the dial 24 and thus clearly illuminates the scale provided thereon. In this manner, the scale may be readily read during the night time.

Beneath the central opening 32 of the dial 24, there is arranged an auxiliary annular dial 25 serving the purpose of indicating the minutes. This dial is attached to a ring 33 constituting the inner race of a ball bearing, the outer race 34 of which is suitably attached to the plate 17. On its top the ring 33 carries a spur gear 36 attached thereto and at its bottom it carries a crown gear 35. The gear 36 is adapted to be driven by the pinion 23 being arranged in mesh therewith, whereas the crown gear 35 is adapted to operate a countercourse-indicator of a known type, for instance of the type disclosed in the Patent No. 1,922,976 to Otto of Aug. 15, 1933.

The transmission provided between the main dial 24 and the auxiliary dial 25 comprises a spur gear 37 attached to a shaft 39 and a pinion 38 attached to the same shaft in mesh with a gear 40 mounted on a shaft 41. On the upper end of the shaft 41, a pinion is mounted engaging internal teeth of the gear 29. The ratio of transmission between the gears 36 and 29 is 1:36. Therefore, the minute dial 25 performs one complete revolution when the main dial 24 turns through ten degrees.

Figure 3:
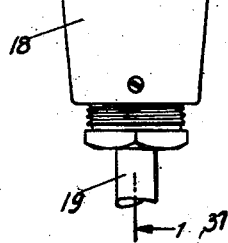
Fig. 3 is the section taken along line 3—3 of Fig. 1.

Within an auxiliary frame 142 depending from the supporting plate 17 the countercourse-indicator is mounted. This indicator comprises a wide number wheel 42 of large diameter and two narrow number wheels 43 and 44 of smaller diameter. While the two latter number wheels are provided with the numbers 0 to 9, the wheel 42 is provided with the numbers 0 to 36. The wheels 43 and 44 are mounted on an axle 45 arranged above the axle 46 of the number wheel 42 in such a manner that the top faces of the three number wheels are disposed within the same horizontal plane closely beneath the minute dial 25. The number wheels 42 and 43 are exposed to view through the central opening of the dials 24 and 25. The number wheel 44 is unnecessary for the purpose of the present invention and is so arranged as to be hidden from view. The number wheels are driven by a pinion 47 which is in mesh with the crown gear 35. Closely above the number wheels the frame 48 of the counter-indicator is provided with three windows through which the two rows of digits provided on the wheel 42 and the single row of digits on the wheel 43 may be read, as will appear from Fig. 3. Therefore, the helmsman may read the course of the ship at first glance with an accuracy up to a tenth of a degree. Between the number wheels 42, 43, 44 there is provided a ten-carrying mechanism of a known type adapted to turn any wheel one step as soon as the adjacent wheel of lower order has completed one revolution.

The supporting plate 17 carries a transformer 49 adapted to supply current to the three electric bulbs 31 the sockets of which are likewise attached to the plate 17.

In the cable 19 there is inserted a switch box (not shown) including a transmitter provided with a hand crank and a switch. By means of this switch the receiving motor 21 may be disconnected from the master compass and may be connected to the transmitter. By subsequent actuation of the hand crank the dials 24 and 25 may be adjusted in conformity with the master compass when the repeater compass is to be put in operation. As the receiving motor 21 must perform a great number of revolutions for one complete revolution of the dial 24, it is not capable by itself when connected to the transmitter of the master compass to turn the dial 24 to the proper position. Once it has been turned to proper position, however, and is connected with the master compass it will be automatically so controlled as to turn the dials 24 and 25 in synchronism with the master compass.

As the window 14 is subjected to a considerable pressure when the submarine boat travels at great depths, its diameter is necessarily limited. Hence, the dial 25 is so small that its scale cannot be easily read directly. Therefore, the compass would not be suited for steering purposes unless it were provided with the counter indicator 43, 44, 45. As this indicator takes up the space below the dials, however, the accommodation of the bulbs offers difficulties. We have eliminated these difficulties in a simple manner by the provision of the conical mirror or reflector 30 which permits the sources 31 of light to be arranged laterally.

While we have described a preferred embodiment of our invention in detail, we wish it to be understood that our invention is not limited to these details but capable of numerous modifications within the scope of the appended claims.

What we claim is:

1. A repeater compass for submarine boats comprising a pressure-proof casing provided with a window, a pressure-proof glass plate inserted in said window, an annular rotary dial substantially coextensive with and mounted below said window within said casing and provided with a scale, means on the outside of said casing for mounting a direction finding instrument including magnifying observation means thereon above said window for reading said scale, and remote-controlled driving means in said case connected to drive said dial and mounted in said casing.

2. A repeater compass for submarine boats comprising a pressure-proof casing provided with a window, a pressure-proof glass plate inserted in said window, an annular rotary dial of translucent material substantially coextensive with and mounted below said window within said casing and provided with a scale, a conical reflector beneath said scale, a plurality of electric bulbs in said casing arranged laterally of said reflector, means on said casing for mounting a direction finding instrument, said instrument including magnifying observation means thereon above said window for reading said scale, and remote-controlled driving means in said casing connected to drive said dial.

3. A repeater compass for submarine boats comprising a pressure-proof casing provided with a circular window, a circular pressure-proof glass plate inserted in said window, an annular rotary dial substantially coextensive and coaxial with and mounted below said window within said casing and provided with a scale, means on said casing for mounting a direction finding instrument including magnifying means thereon above said window for reading said scale, and remote-controlled driving means in said casing connected to drive said dial, whereby the course indicated at any time may be read through said direction finding instrument.

4. A repeater compass for submarine boats comprising a pressure-proof casing provided with a window, a pressure-proof glass plate inserted in said window, the dimensions thereof being insufficient fully to display a compass dial of readable size, a gearing mounted in said casing, an annular rotary dial substantially coextensive with and mounted below said window within said casing and connected with said gearing and provided with a scale too fine for direct visual observation and normally unsuitable for steering purposes, a second annular rotary dial mounted below the first-mentioned dial and connected with said gearing and extending substantially inwardly therefrom, said second dial having a scale calibrated in minutes for direct visual observation, means on the outside of said casing for mounting a direction-finding instrument including magnifying observation means thereon above said window for reading said scales, and remote-controlled driving means in said casing connected with said gearing to drive said dials.

5. In a repeater compass for submarine boats comprising a pressure-proof casing provided with a window and a pressure-proof glass plate inserted in said window, the dimensions thereof being insufficient fully to display a compass dial of readable size, a gearing mounted in said casing; a rotary dial substantially coextensive with and mounted below said window within said casing and connected with said gearing and provided with a scale too fine for direct visual observation and normally unsuitable for steering purposes, a second rotary dial mounted coaxially with the gearing and having a scale calibrated in minutes for direct visual observation, means on the outside of said casing for mounting a direction-finding instrument including magnifying observation means thereon above said window for reading said scales, and remote-controlled driving means in said casing connected with said gearing to drive said dials.

BRUNO von ANDREATTA.
WILHELM KRAUSKOPF.